INVENTORS
CHARLES P. KETTLER
JOHN M. QUESTEL

BY

Freeman + Taylor

ATTORNEYS

March 30, 1971   C. P. KETTLER ET AL   3,573,128
METHOD AND APPARATUS FOR PRODUCING PRESSURE SENSITIVE TAPE
Filed April 18, 1968   4 Sheets-Sheet 3

INVENTORS
CHARLES P. KETTLER
JOHN M. QUESTEL
BY
Freeman + Taylor
ATTORNEYS

INVENTORS
CHARLES P. KETTLER
JOHN M. QUESTEL
BY
Freeman + Taylor
ATTORNEYS

United States Patent Office 3,573,128
Patented Mar. 30, 1971

3,573,128
METHOD AND APPARATUS FOR PRODUCING PRESSURE SENSITIVE TAPE
Charles P. Kettler, Akron, and John M. Questel, Stow, Ohio, assignors to Morgan Adhesives Company, Stow, Ohio
Filed Apr. 18, 1968, Ser. No. 722,437
Int. Cl. B32b *31/20;* C09j *5/06*
U.S. Cl. 156—283                          10 Claims

ABSTRACT OF THE DISCLOSURE

A method and apparatus for making permanently tacky pressure sensitive tape including a heated, independently driven, main drum surrounded by adjustable planetary rolls which can be moved into and out of adjacency with the periphery of the heated drum. A first layer of release paper is adapted to be passed around the heated drum and beneath said planetary rolls and onto a take-up roll. A layer of open web paper is adapted to be passed beneath a power source and then about the periphery of the heated drum on top of the first layer of release paper. A second layer of release paper is adapted to be passed around the periphery of the heated drum on top of the open web paper after the depositing of the powder thereon, the heated drum and the planetary rolls being driven independently of each other and the planetary rolls serving to planish the laminate and prevent nip buildup.

BACKGROUND OF THE INVENTION

This invention in general relates to the art of making pressure sensitive adhesive tape for a variety of commercial, industrial and home uses. The finished product normally comprises a laminate of web paper impregnated with permanently tacky adhesive material and sandwiched between layers of easily removable release paper.

DESCRIPTION OF THE PRIOR ART

The following prior art is know to applicant: U.S. Pats. 1,619,027 McLaurin, 1,989,875 McLaurin, 2,355,919 Lipsius, 2,513,434 Tinsley, 2,872,365 DeBruyne et al., 2,890,147 Pearson et al., 3,218,185 Letteron.

While some of the above prior art references disclose the broad concept of dropping powdered material onto a web and then later heating it to impregnate the web, none of the references referred to disclose the novel method and apparatus for producing the laminate which will be described below.

SUMMARY OF THE INVENTION

It has been discovered that a new and improved method and apparatus for producing pressure sensitive tape can be achieved by providing a main independently driven heated drum. A three-piece laminate is passed about this drum with the laminate comprising a first sheet of release paper, a second sheet of open web paper upon which the adhesive material is deposited in powdered form before reaching the heated drum and a second sheet of release paper which is applied over the web paper. The laminate is passed about the periphery of the heated drum and a series of adjustable planetary rolls are provided to prevent a nip build-up and also to provide planishing.

The laminate, after passing about the heated drum, is either entirely wound on a take-up roll or the first sheet of release paper and the web paper are taken up on one roll while the second sheet of release paper may be taken up on still another roll.

The planetary rolls are normally independently driven and are adjustable relatively of the periphery of the main heated drum.

As a result of being heated while passing over the heated drum the adhesive material becomes permanently aggressively tacky thereby giving it the desired adhesion characteristics.

Accordingly, production of a method and apparatus having the above characteristics becomes the principal object of this invention with other objects thereof becoming more apparent upon a reading of the following brief specification considered and interpreted in view of the accompanying drawings.

Figure 1:
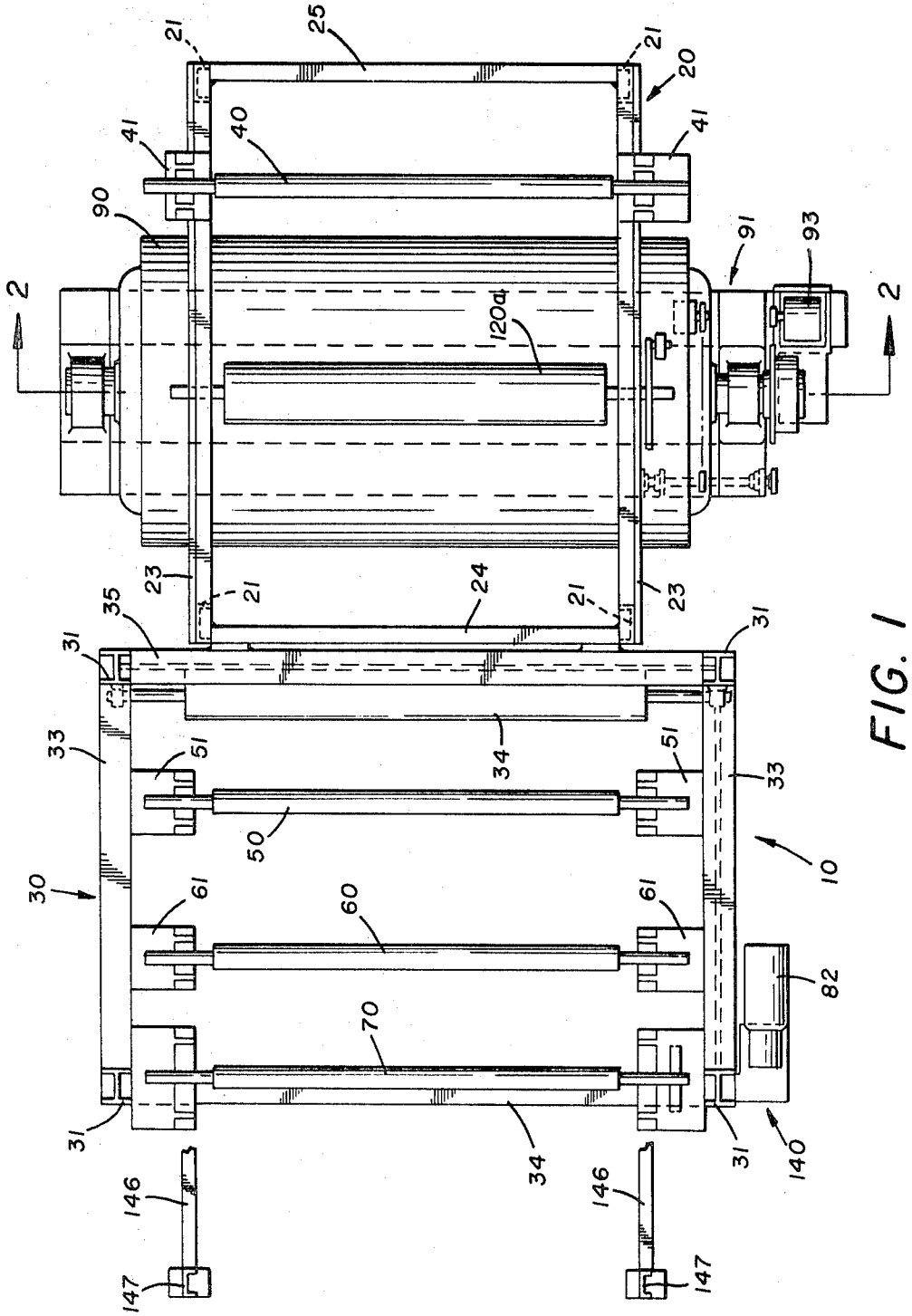
Figure 2:
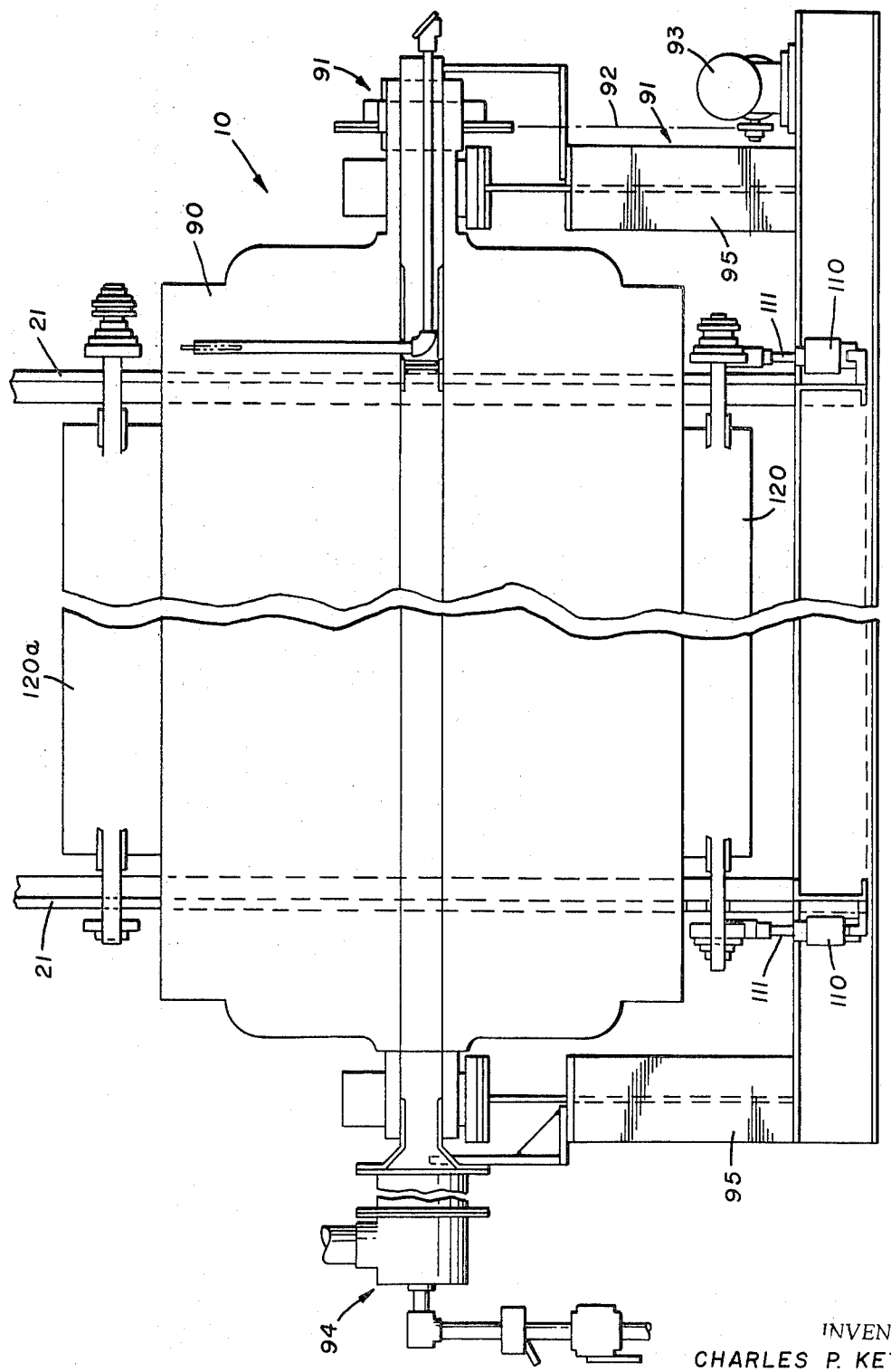
Figure 3:
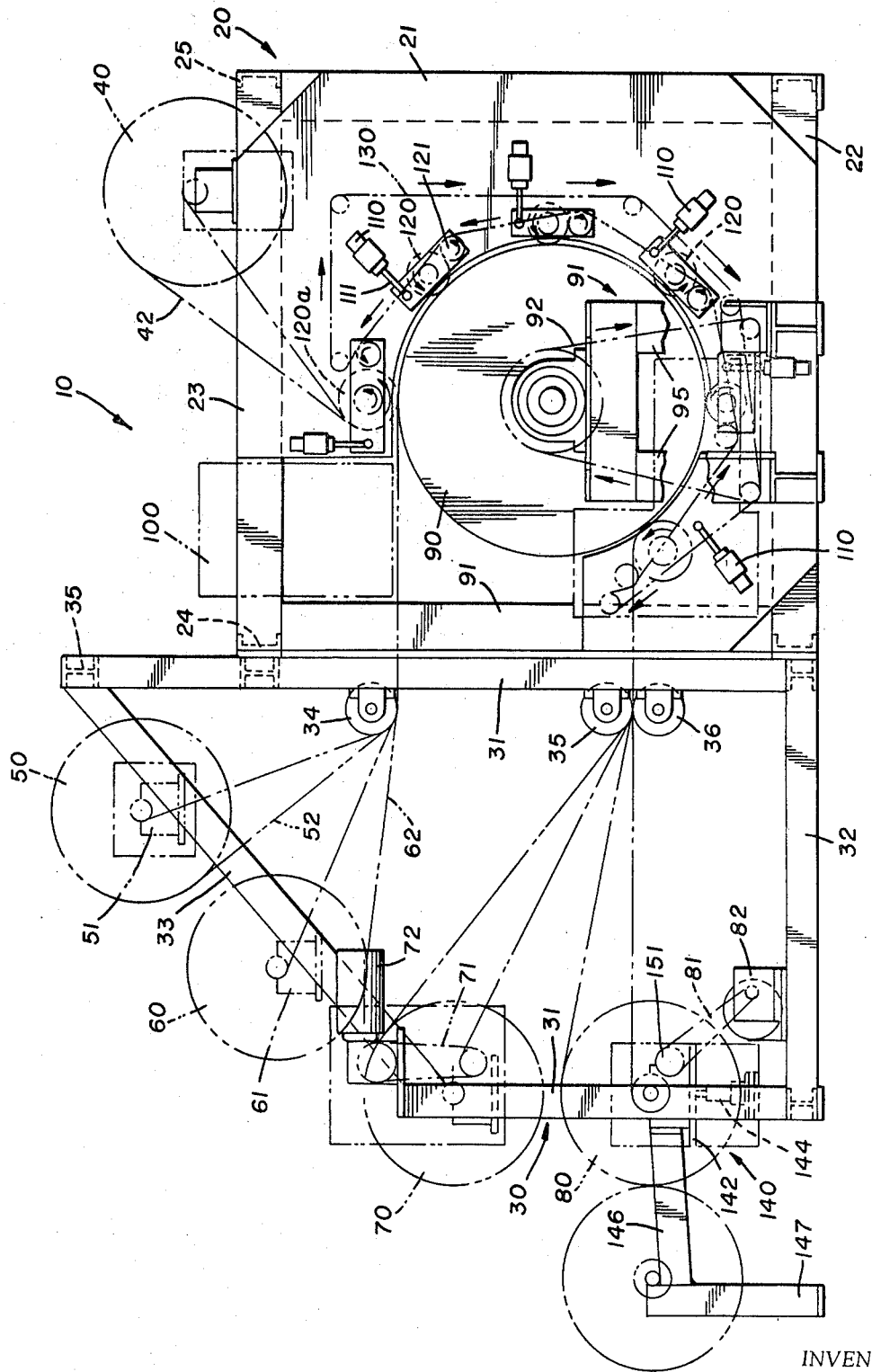
Figure 4:
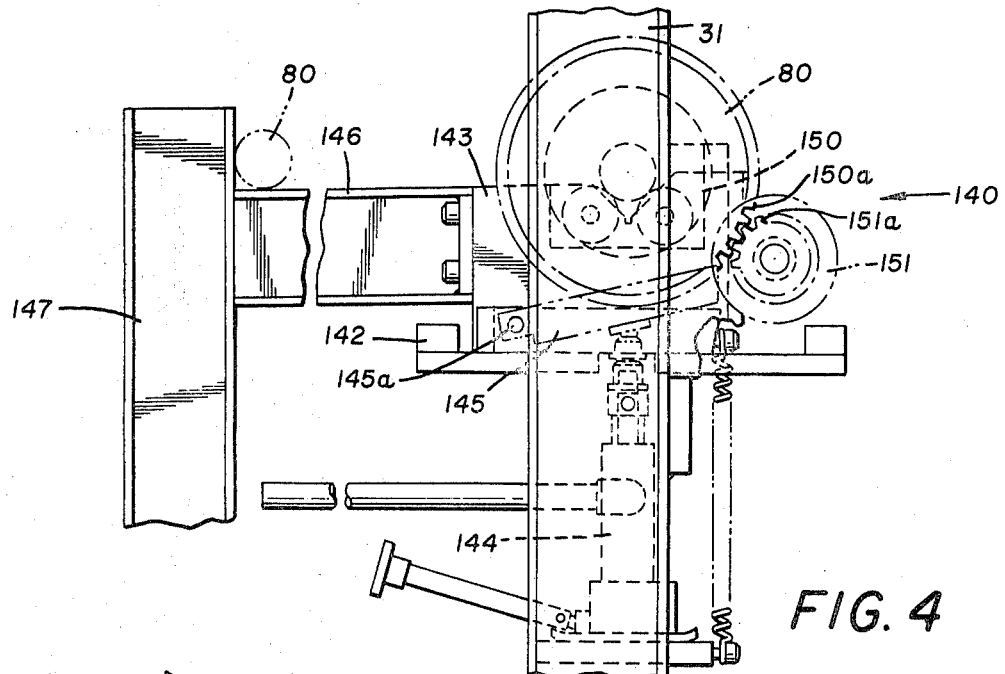
Figure 5:
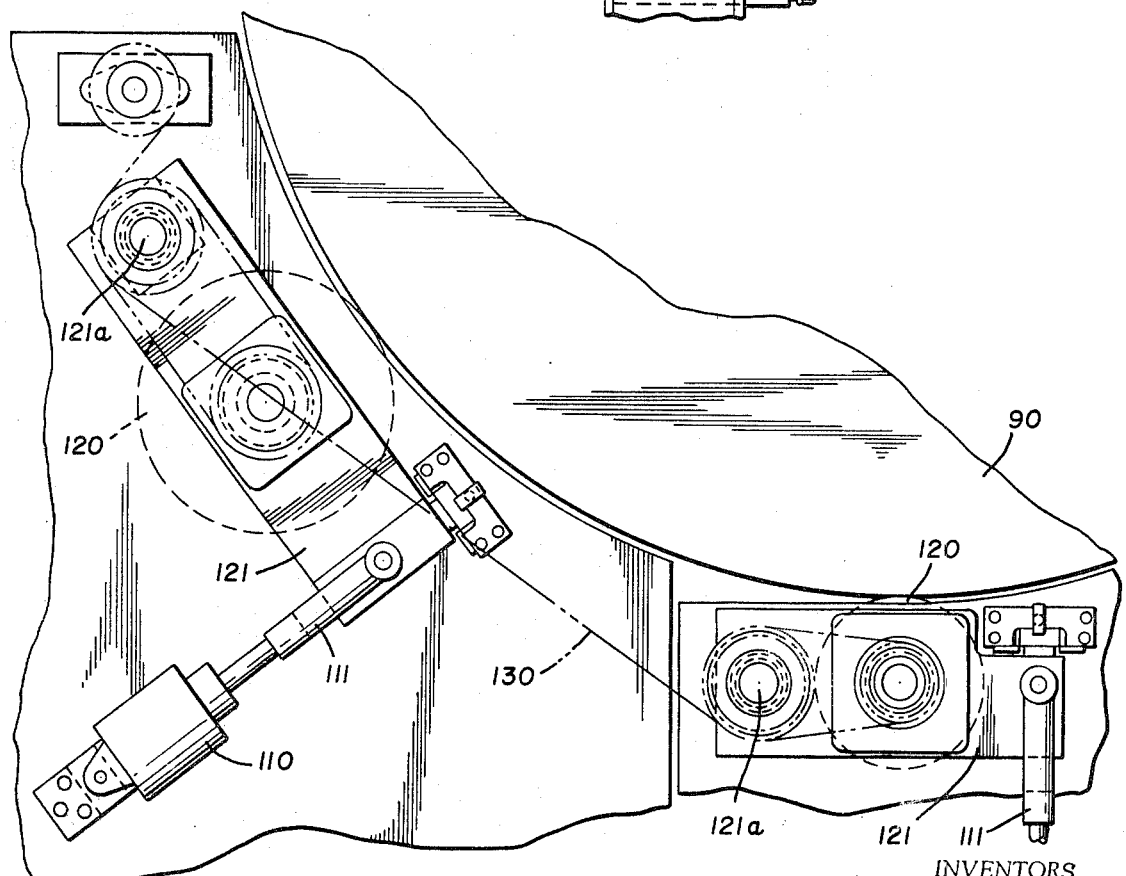

Of the drawings:
FIG. 1 is a top plan view showing the improved apparatus for producing pressure sensitive tape.
FIG. 2 is a sectional view taken on the lines 2—2 of FIG. 1.
FIG. 3 is a side elevational partially schematic view of the improved machine.
FIG. 4 is a detailed view of the apparatus for unloading the machine.
FIG. 5 is a detailed view of the planetary rolls.

Considering first then the major components of the improved machine and referring particularly to FIG. 3, it will be noted that the machine, generally indicated by the numeral 10, includes a main frame 20 which is mounted on the floor and an auxiliary frame 30 preferably bolted or attached in a similar way to main frame 20. It should be noted that while a main and auxiliary frame are shown, the machine could have a unitary frame if desired.

The main frame 20 carries a freely journalled top release paper roll 40 while auxiliary frame 30 carries freely journalled open web paper roll 50 and bottom release paper roll 60. Additionally, the auxiliary frame 30 carries driven take-up rolls 70 and 80 as well as unloading mechanism 140.

In addition to the top release paper roll 40, the main frame 20 also has mounted thereon heated drum 90, powder dispenser 100 and planetary rolls 120, 120 together with their associated retractors 110, 110 and chain drive 130.

Considering first then the detailed construction of the main frame 20, it will be seen that the same includes a series of upright girders 21, 21 and top and bottom cross members 22 and 23 as well as cross members 24 and 25. These various frame members are secured together by welding or other suitable means so as to generally form an open cube-like framework.

The auxiliary frame 30 also includes upright girders 31, 31, bottom girders 32, 32 and inclined top girders 33, 33 and cross members 34 and 35 with these members also being fastened together by welding or other suitable means and preferably being secured to the main frame 20.

Only a brief description has been given with regard to frame members 20 and 30 since they do not really form a part of the invention and could be, in reality, of any desired construction so long as they are capable of supporting the various operational elements of the overall apparatus.

Turning next then to the heated drum 90, the same is carried by a support unit 91 and is secured to a power source 93 and driven by either a chain gear drive or a belt type drive, generally represented by the numeral 92 in FIG. 3. This drum 90, which is supported on arms 95, 95, is heated by any desired heating element, generally indicated by the numeral 94 in FIG. 2 and it should be noted that preferably the outside temperature of the drum is from 400 to 500° F. although it is to be understood that this temperature range can vary depending upon the particular adhesive material being utilized.

In addition to heated drum 90, the main frame also carries a series of planetary rolls 120, 120 which are pivotally mounted and associated with retractable pistons 110, 110 which enable the rolls 120, 120 to be moved toward and away from the periphery of the heated drum 90. Thus, for example, upon retraction of the piston 111 of retractor 110, the planetary roll 120 would be pulled away from the periphery of heated drum 90 by pivoting about point 121a.

Planetary rolls 120, 120 are driven by a chain or belt drive 130 which is attached to an independent power source (not shown) which preferably operate independently of the power source for the heated drum 90 although, if desired, the same power source may be used.

Finally, main frame 20 has a mounting member 41 which, in turn, has top release paper roll 40 journalled thereon for purposes which will be described in greater detail below.

Turning next then to auxiliary frame 30, it will be noted that the same carries a support 51 and web paper roll 50 is freely journalled thereon. Disposed adjacent roll 50 is support 61 and bottom release paper roll 60 is again freely journalled thereon.

In addition, take-up rolls 70 and 80 are also carried by uprights 31, 31 of auxiliary frame 30 and are driven by drive means 71 and 81 respectively which are attached to suitable power sources 72 and 82.

Finally, auxiliary frame 30 has associated therewith a take-off means 140 which will also be described in greater detail below.

Considering next then FIG. 4 for a detailed view of the unloading mechanism 140, it will be noted that this mechanism includes a cross piece 142 mounted between uprights 31, 31 of auxiliary frame 30. Carried on the cross piece 142 is a V-block 143 onto which is journalled the take-up roll 80.

Roll 80 is driven by a drive means which includes rolls 150 and 151 which have meshing teeth 150a and 151a with roll 151 being driven by motor 82. Disposed beneath the body of the roll 80 is an air cylinder 144 and a pivotally mounted ejection arm 145 which is designed to be moved into and out of contact with the body of the roll 80 by action of the air cylinder 144 and the piston associated therewith.

Extending to the left of FIG. 4 are a pair of rails 146, 146. These rails are secured to cross piece 142 and slope slightly downward and terminate at vertical members 147, 147.

In operation of the unloading means, it will first be assumed that when the take-up roll 80 is loaded with the desired quantity of tape that air cylinder 144 will be actuated thereby raising arm 145 by pivoting it about point 145a. This will cause the roll 80 to be forced upward out of the V pocket in block 143 and onto the rails 146, 146. Due to the fact that these rails are inclined slightly downwardly, the roll will then roll down the rails until stopped by upright 147. The take-up roll mechanism is then ready to receive a new take-up roll and the operation can be continued.

Considering next then FIG. 5 for a detailed examination of the planetary rolls and their associated retractor mechanisms, it will be noted that each of the planetary rolls 120, 120 is carried on elongate mounting arms 121, 121 and these arms are pivotally mounted at one end on the frame 20 at 121a. The opposed end of each arm 121 is secured to the end of the piston 111 which in turn is associated with the cylinder 110. It is believed apparent from an examination of FIG. 5 that upon retraction of the piston 111 by actuation of the cylinder 110 that the free end of the arm 121 will be pulled away from the main heated drum 90. Similarly, reversal of the motion of the piston will return the planetary roll to close adjacency with the periphery of the drum 90.

This feature not only facilitates the initial threading operation but also provides means for adjusting the spacing between the planetary rolls 120, 120 and drum 90.

In use or operation of the improved method and apparatus which forms the subject matter of this invention, it will first be assumed that the parts have been assembled to the condition shown in FIG. 3. At this time, the bottom release paper 62 which is generally coated with a silicone adhesive is threaded around idler 34 and onto the heated drum 90.

The open web paper 52 is also stripped from the roll 50 and passed beneath idler 34 on top of release paper 62 and started about the periphery of the drum 90.

At this time, the dispenser 100, which is a conventional vibratory powder dispenser such as that made, for example, by Cleveland Vibratory Corporation, is actuated. This dispenser delivers a measured amount of powdered adhesive material onto the open web paper 52. As will be noted from FIG. 3, the powder is deposited on the web paper before the laminate which includes the bottom release paper 62 and web paper 52 reaches the heated roll.

After the powder has been deposited on web paper 52, the top release paper 42 is stripped from roll 40, passed over planetary roll 120a and threaded on top of the web paper 52 and about the periphery of the heated drum 90. It is contemplated that, at least in the start-up operation, planetary rolls 120, 120 would be in their retracted position to facilitate threading the initial laminate about the drum 90. Once this has been done, of course, the planetary rolls 120, 120 can be moved into contact with the laminate by actuating retractors 110, 110 so as to enable them to perform their planishing and anti-nip functions.

The laminate, after passing about the periphery of drum 90 and having the adhesive material heated to a fluid condition, is passed between rollers 35 and 36 and at this point at least the bottom release paper and the web paper will be threaded onto take-up drum 80. It should be understood here that the entire laminate including the top release paper could be threaded onto drum 80, or if desired, the top release paper can be separated after the laminate emerges from between rolls 35 and 36 and wound up on take-up roll 70 for reuse if desired.

From the foregoing it will be seen that the apparatus shown provides for first forming a laminate which contains a layer of open web paper sandwiched between two layers of release paper and carrying with it a layer of adhesive material in powdered form. This laminate is then passed about a heated drum which serves to turn the individual rubber molecules of the adhesive compound into a fluid condition. In other words, adjacent molecules will melt and dissolve into union with each other so as to provide the desired condition. After leaving the heated drum, the laminate will, of course, cool and harden into a permanently tacky condition.

The end product obtained thereby is then wound on suitable take-up rolls, which are unloaded by operation of unloading means 140, and is in condition for shipment to the user.

As been shown by the foregoing then, how an improved method and apparatus for making pressure sensitive tape can be obtained.

It should be noted here that much of the power mechanism required to drive the various driven components of this apparatus have either not been shown or have been shown schematically since they are, in most respects, conventional. The same is true with regard to the various electrical controls necessary to properly time the various drive means.

It should be noted here that the invention has been described in connection with an open web paper, but it can be utilized equally well with facing stock of films, foil or paper so that only one side will carry the adhesive.

Also "release" paper has been described although any adherent can be used.

Finally, while the preferred form of the invention envisions the use of heated roll 90, the principles thereof can also be utilized by passing the laminate through a heated oven on a supported belt with nip rolls being employed for the desired planishing effect.

While a full and complete description of the invention has been set forth in accordance with the dictates of the patent statutes, it is to be understood that the invention is not intended to be limited to the specification herein illustrated. Accordingly, modifications of the invention may be resorted to without departing from the spirit hereof or the scope of the appended claims.

What is claimed is:

1. A method of producing a permanently tacky pressure sensitive adhesive tape of the character described comprising the steps of;
  (A) forming a laminate of a first sheet of release paper and a sheet of open web paper;
  (B) depositing a layer of powdered adhesive material on said web paper;
  (C) applying a second sheet of release paper over said web paper; and
  (D) passing the laminate formed thereby about a heated drum
    (1) whereby said adhesive material becomes permanently tacky.

2. The method of claim 1 further characterized by the step of planishing said liminate as it is passed around said drum.

3. A method as in claim 1 and including the step of planishing said laminate at a plurality of positions spaced circumferentially of said drum as said laminate passes around said drum.

4. A machine for producing permanently tacky pressure sensitive adhesive tape from a powder of the character described, comprising;
  (A) a frame;
  (B) a first release paper supply source carried by said frame;
  (C) an open web paper supply source carried by said frame;
  (D) an independently driven heated drum carried by said frame;
  (E) means for passing said release paper and said open web paper about the periphery of said drum;
  (F) a dispenser carried by said frame and adapted to deposite powdered adhesive onto said open web paper between said supply sources and said drum;
  (G) a second release paper supply source carried by said frame;
  (H) means for applying a layer of release paper from said second release paper supply source on top of said open web paper after said powdered adhesive is deposited thereon.

5. The device of claim 4 further characterized by the presence of means carried by said frame and adapted to planish the laminate formed by said release paper and said web paper while the same is passing about said drum.

6. The device of claim 5 further characterized by the fact that said last mentioned means are adjustable relatively of the periphery of said drum.

7. The device of claim 6 further characterized by the fact that said means include at least one independently driven planetary roll.

8. A machine as in claim 4 and further including at least one planishing roll positioned adjacent but spaced from the periphery of said drum.

9. A machine as in claim 8 and further including separate drive means for said planishing roll.

10. A method of producing a permanently tacky pressure sensitive adhesive tape of the character described comprising the steps of:
  (A) providing an adhesive sheet;
  (B) depositing a layer of powdered adhesive material on said carrier sheet;
  (C) applying a sheet of release paper over said adhesive material layer;
  (D) passing the laminate formed thereby about a heated drum whereby said adhesive material becomes fluid;
  (E) planishing the laminate as it passes around the drum; and
  (F) allowing the adhesive to set into a permanently tacky condition and be bonded to said carrier sheet.

References Cited

UNITED STATES PATENTS

| | | | |
|---|---|---|---|
| 1,427,477 | 8/1922 | Kaufmann et al. | 156—551X |
| 2,599,359 | 6/1952 | Banks et al. | 156—289UX |
| 2,635,823 | 4/1953 | Weber et al. | 242—58.6 |
| 2,985,554 | 5/1961 | Dickard | 156—289X |
| 3,081,212 | 3/1963 | Taylor et al. | 156—164 |

BENJAMIN A. BORCHELT, Primary Examiner

J. M. HANLEY, Assistant Examiner

U.S. Cl. X.R.

156—289, 320, 549, 582